(12) United States Patent
Hu et al.

(10) Patent No.: US 11,818,057 B2
(45) Date of Patent: Nov. 14, 2023

(54) METHOD AND APPARATUS FOR PROCESSING DATA, DEVICE, AND STORAGE MEDIUM

(71) Applicant: ZTE CORPORATION, Guangdong (CN)

(72) Inventors: Tao Hu, Guangdong (CN); Gang Zhao, Guangdong (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 0 days.

(21) Appl. No.: 17/771,810

(22) PCT Filed: Dec. 2, 2020

(86) PCT No.: PCT/CN2020/133420
§ 371 (c)(1),
(2) Date: Apr. 25, 2022

(87) PCT Pub. No.: WO2021/110056
PCT Pub. Date: Jun. 10, 2021

(65) Prior Publication Data
US 2022/0377025 A1 Nov. 24, 2022

(30) Foreign Application Priority Data
Dec. 6, 2019 (CN) .......................... 201911242582.3

(51) Int. Cl.
*H04L 49/25* (2022.01)
*H04L 45/02* (2022.01)
*H04L 49/101* (2022.01)

(52) U.S. Cl.
CPC .............. *H04L 49/25* (2013.01); *H04L 45/02* (2013.01); *H04L 49/101* (2013.01)

(58) Field of Classification Search
CPC ......... H04L 49/25; H04L 45/02; H04L 45/56; H04L 45/566; H04L 49/101; H04L 49/60; H04L 49/15; H04L 49/118; H04L 45/76
See application file for complete search history.

(56) References Cited

U.S. PATENT DOCUMENTS 7,035,212 B1 * 4/2006 Mittal ..................... H04L 45/60
370/413
9,444,713 B1 * 9/2016 Dropps ................. H04L 5/0007
(Continued)

FOREIGN PATENT DOCUMENTS

CA     2369178 A1    7/2003
CN   104468416 A    3/2015
(Continued)

OTHER PUBLICATIONS

ZTE Corporation, International Search Report with English translation, PCT/CN2020/133420, dated Mar. 3, 2021, 7 pgs.
(Continued)

*Primary Examiner* — Mohamed A Kamara
(74) *Attorney, Agent, or Firm* — MH2 TECHNOLOGY LAW GROUP LLP

(57) ABSTRACT

The present disclosure provides a method and apparatus for processing data, a device and a storage medium. The method includes receiving and processing data; obtaining a transmission path of the data; transmitting the data to a destination output port of the data according to the transmission path; and processing the data at the destination output port.

17 Claims, 2 Drawing Sheets

(56) References Cited

U.S. PATENT DOCUMENTS

| | | | |
|---|---|---|---|
| 2014/0098818 A1* | 4/2014 | Matthews | H04L 45/74 370/392 |
| 2014/0122765 A1* | 5/2014 | Subramaniyan | G06F 21/85 710/308 |
| 2014/0241362 A1 | 8/2014 | Bosshart et al. | |
| 2014/0321324 A1* | 10/2014 | Beshai | H04L 49/103 370/254 |
| 2017/0034606 A1 | 2/2017 | Ma et al. | |
| 2018/0054664 A1 | 2/2018 | Yang | |
| 2018/0310078 A1 | 10/2018 | Szymanski | |

FOREIGN PATENT DOCUMENTS

| | | |
|---|---|---|
| CN | 104917702 A | 9/2015 |
| CN | 105099565 A | 11/2015 |
| CN | 107193085 A | 9/2017 |
| CN | 108270698 A | 7/2018 |
| CN | 109768926 A | 5/2019 |
| CN | 110536187 A | 12/2019 |
| WO | 2016172819 A1 | 11/2016 |
| WO | 2017059550 A1 | 4/2017 |

OTHER PUBLICATIONS

Extended European Search Report dated Dec. 16, 2022 in corresponding European Application No. 20896450.2, 8 pages.
Chinese First Office Action, dated Jul. 25, 2023 in corresponding Chinese Application No. 201911242582.3, translated, 15 pages.

* cited by examiner

METHOD AND APPARATUS FOR PROCESSING DATA, DEVICE, AND STORAGE MEDIUM

CROSS REFERENCE TO RELATED APPLICATIONS

The present application is a United States National Stage Application filed under 35 U.S.C. § 371 of PCT Patent Application Serial No. PCT/CN2020/133420, filed Dec. 2, 2020, which claims priority to Chinese patent application No. 201911242582.3, filed Dec. 6, 2019, which is incorporated by reference herein in its entirety.

TECHNICAL FIELD

The various embodiments of the present disclosure relate in general to communication technology, and more specifically to a method and apparatus for processing data, a device, and a storage medium.

BACKGROUND

There are a lot of unicast data switching inside communication products in the communication field such as software defined network (SDN). In some cases, the unicast data switching network is implemented in a crossbar matrix structure. In the Crossbar matrix structure, every input port of source data needs to be in one-to-one direct connection with every output port of the source data, and a destination address of the source data from each input port is compared with a physical address of each corresponding output port by a comparator to determine whether they are the same, so as to ensure that the output port receives the corresponding data from the corresponding input port, thereby completing the data transmission.

SUMMARY

Some embodiments of the present disclosure provide a method for processing data including: receiving and processing data; obtaining a transmission path of the data; transmitting the data to a destination output port of the data according to the transmission path; and processing the data at the destination output port.

Some embodiments of the present disclosure further provide an apparatus for processing data including: a processing module, configured to receive and process data; an obtaining module, configured to obtain a transmission path of the data; and a transmitting module, configured to transmit the data to a destination output port of the data according to the transmission path; wherein the processing module is further configured to process the data at the destination output port.

Some embodiments of the present disclosure further provide a device including a memory, at least one processor, and a computer program stored on the memory and executable on the at least one processor, wherein the at least one processor executes the computer program to perform the method for processing data according to the embodiments of the present disclosure.

Some embodiments of the present disclosure further provide a computer readable storage medium storing a computer program that, when executed by at least one processor, causes the at least one processor to perform the method for processing data according to the embodiments of the present disclosure.

With respect to the above embodiments and other aspects of the present disclosure and implementations thereof, more description is provided in the accompanying drawings, specific embodiments, and appended claims.

DETAILED DESCRIPTION OF THE EMBODIMENTS

In order to make the purposes, technical solutions and advantages of the present disclosure clearer, the following describes the embodiments of the present disclosure in detail with reference to the accompanying drawings. It should be noted that the embodiments of the present disclosure and the features in the embodiments may be arbitrarily combined with each other without conflict.

In addition, in embodiments of the present disclosure, the words "in some cases" or "for example" are used to mean to illustrate, exemplify, or illustrate. Any embodiment or design described as "in some cases" or "for example" in the embodiments of the present disclosure shall not be construed to be preferred or superior to other embodiments or designs. Specifically, the use of words such as "in some cases" or "for example" is intended to present relevant concepts in a specific manner.

For a crossbar matrix structure having N input ports and M output ports, a total number of traces inside the crossbar matrix structure is N×M, and the number of comparators is N×M. The inventor found that due to the crossbar matrix structure itself, both the total number of traces inside the crossbar matrix structure and the number of comparators are too large when the number of input ports and output ports is large, which results in occupying excessive resources and reducing the use efficiency of resources, thereby causing waste of resources and increasing the cost of equipment.

Figure 1:
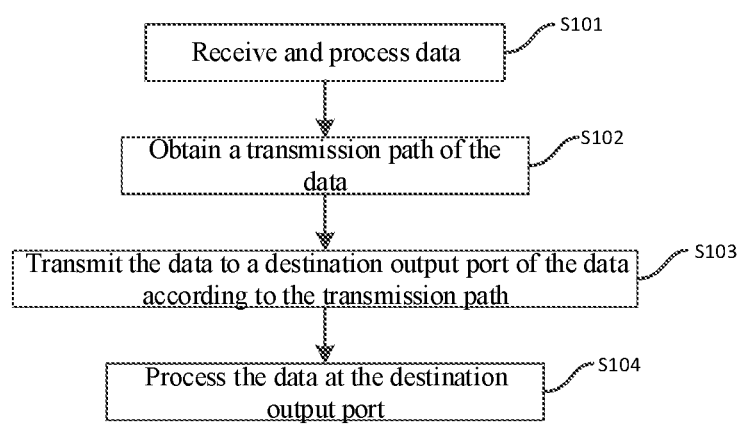
FIG. 1 is a flowchart of a method for processing data according to an embodiment.

FIG. 1 is a flowchart of a method for processing data according to an embodiment. As shown in FIG. 1, the method includes the following operations.

In S101, data is received and processed.

In this embodiment, the received data may be any service data, such as data obtained by interaction between devices, data downloaded by the devices from the network, and the like.

In some cases, the received data may include at least a destination output port of the data and a validity indication signal of the data.

Furthermore, the data may be pre-processed after the data is acquired.

For example, a processing method provided in this embodiment of the present disclosure is to obtain the destination output port of the data after receiving the data, and sort the received data according to the destination output port. For example, the data may be sorted according to a size of an address of the destination output port of the data.

In some cases, the received data may be sorted by means of a software sorting algorithm or hardware circuit processing.

In S102, a transmission path of the data is obtained.

After the operation S101 of processing the data, the transmission path of the processed data is determined.

For example, a switching network node on and a configuration parameter of the switching network node are determined according to a source input port and a destination output port of the received data.

Figure 2:
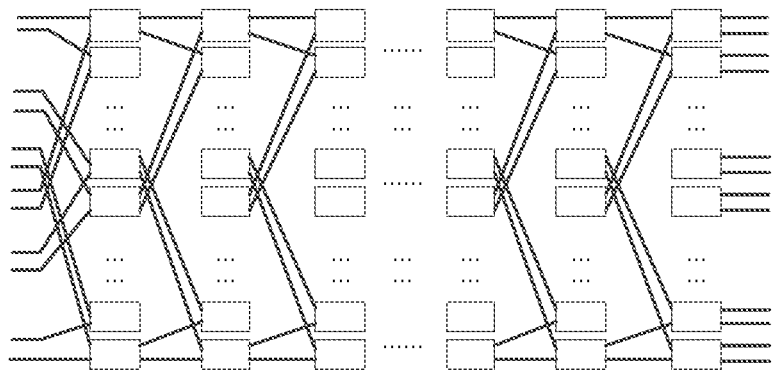
FIG. 2 is a schematic diagram of a network structure of a data transmission path.

It should be noted that the transmission path of the data consists of at least one switching network node, and a network structure diagram of the transmission path of the data is shown in FIG. 2. A comparator is used to implement corresponding functions of each switching network node. In the data transmission network, any two levels of switching network nodes are connected in a uniform shuffling manner.

Then, the at least one switching network node is configured according to the configuration parameter of each switching network node to generate the transmission path of the data.

The configuration parameter may be a working state of the switching network node.

Figure 3:
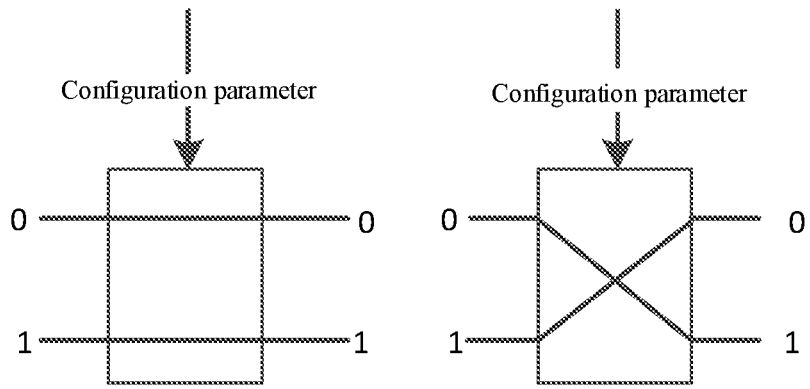
FIG. 3 is a schematic diagram showing a working state of a switching network node.

In some cases, as shown in FIG. 3, the working state may be a through transmission state or a cross transmission state.

Similarly, the transmission path of the data may be obtained by means of software operation or hardware circuit processing.

Both a specific software operation mode and a specific hardware circuit may adopt existing implementations, which are not limited in this embodiment of the present disclosure.

In S103, the data is transmitted to the destination output port of the data according to the transmission path.

After obtaining the transmission path of the data, the data is transmitted to the destination output port of the data through the transmission path determined in the data transmission network shown in FIG. 2.

For example, the data is transmitted to the destination output port of the data according to the working state of each switching network node on the transmission path.

For example, when a switching network node is in the through transmission state, the switching network node completes data switching from an input port 0 to an output port 0 and from an input port 1 to an output port 1. When the switching network node is in the cross transmission state, the switching network node completes data switching from the input port 0 to the output port 1 and from the input port 1 to the output port 0, so as to select a corresponding data transmission path according to the working state of the switching network node, and complete data transmission to the destination output port.

In S104, the data is processed at the destination output port.

Based on the processing procedure of operations S101 to S103 described above, the data is processed after receiving the transmitted data at the destination output port.

In some cases, in the embodiments of the present disclosure, the received data includes a validity indication signal of the data, and therefore, the data is processed at the destination output port according to the validity indication signal of the data.

In one example, in response to determining that the data is valid according to the validity indication signal of the data, the data is normally received at the destination output port.

Alternatively, in response to determining that the data is invalid according to the validity indication signal of the data, the data is not processed and is discarded directly at the destination output port.

As shown in FIG. 2, the data transmission network consists of two parts, i.e., switching network nodes (shown as blocks in FIG. 2) and traces (shown as lines in FIG. 2) between the switching network nodes. For a switching network having N input ports, the number of levels is $\log_2(N)$. Each level includes N/2 switching network nodes. For a switching network having N input ports and M output ports, if N>M, the total number of traces inside the network is $N \times \log_2(N)$, and the number of switching network nodes is $N/2 \times \log_2(N)$. If N<M, the total number of traces inside the network is $M \times \log_2(M)$, and the number of switching network nodes is $M/2 \times \log_2(M)$.

Through the above implementation process, when the number of input ports and output ports in the data transmission network is large, the number of traces and the number of switching network nodes in the data transmission network are able to be effectively reduced while realizing the same function of the crossbar matrix structure, thereby improving the use efficiency of resources and reducing the cost.

Figure 4:
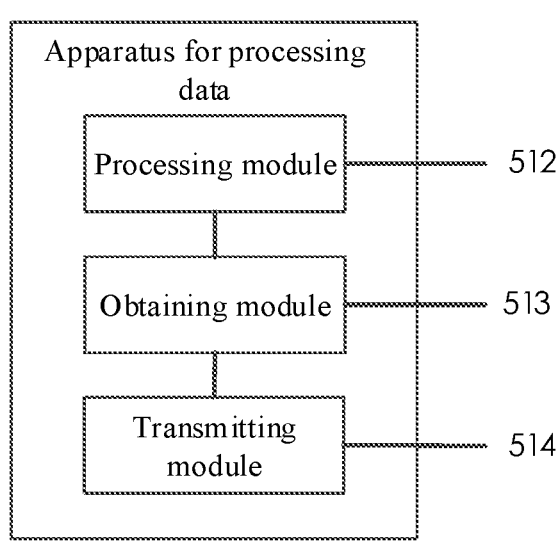
FIG. 4 is a schematic structural diagram of an apparatus for processing data according to an embodiment.

FIG. 4 is an apparatus for processing data according to an embodiment. As shown in FIG. 4, the apparatus includes a processing module 401, an obtaining module 402, and a transmitting module 403.

The processing module is configured to receive and process data.

The obtaining module is configured to obtain a transmission path of the data.

The transmission module is configured to transmit the data to a destination output port of the data according to the transmission path.

Furthermore, the processing module is further configured to process the data at the destination output port.

In one example, the processing module is configured to acquire the destination output port of the data and sort the data according to the destination output port.

In one example, the obtaining module includes a determining unit and a configuring unit.

The determining unit is configured to determine at least one switching network node on the transmission path of the data and a configuration parameter of each of the at least one switching network node according to a source input port and the destination output port of the data.

The configuring unit is configured to configure each of the at least one switching network node according to the configuration parameter to generate the transmission path of the data.

The configuration parameter is a working state of each of the at least one switching network node, and the working state includes a through transmission state and a cross transmission state.

In one example, the transmitting module is configured to transmit the data to the destination output port of the data according to the working state of each of the at least one switching network node on the transmission path.

In one example, the processing module is configured to process the data at the destination output port according to a validity indication signal of the data.

For example, a processing mode of the processing module may be to receive the data at the destination output port in response to determining that the data is valid according to the validity indication signal of the data, alternatively, may be to discard the data at the destination output port in response to determining that the data is invalid according to the validity indication signal of the data.

Figure 5:
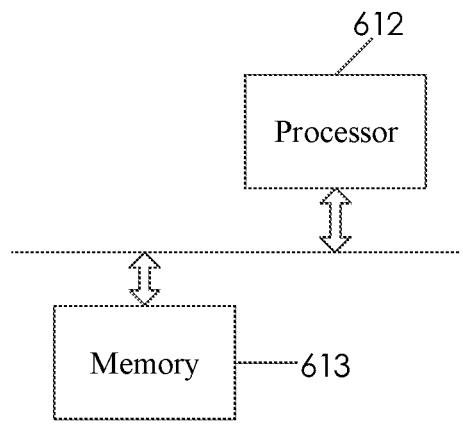
FIG. 5 is a schematic structural diagram of a device according to an embodiment.

FIG. 5 is a schematic structural diagram of a device. As shown in FIG. 5, the device includes a processor 501 and a memory 502. The number of processors 501 in the device may be one or more. FIG. 5 shows an example of one processor 501. The processor 501 and the memory 502 in the device may be connected by a bus or other means.

As a computer readable storage medium, the memory 502 may be configured to store a software program, a computer executable program, and a program instruction/module (e.g., the processing module 401, obtaining module 402, and transmitting module 403 in the apparatus for processing data) corresponding to the method for processing data in the embodiment of FIG. 1 in the present disclosure. The processor 501 implements the method for processing data by executing the software program, instructions, and modules stored in the memory 502.

The memory 502 mainly includes a program storage area and a data storage area. The program storage area may store an operating system, an application program required for at least one function. The data storage area may store data or the like generated according to the use of the optical network controller. Furthermore, the memory 502 may include high-speed random access memory, and may further include non-volatile memory, such as at least one disk storage device, a flash memory device, or other non-volatile solid-state storage device.

Embodiments of the present disclosure further provide a storage medium including computer executable instructions that, when executed by a computer processor, cause the computer processor to perform the method for processing data. The method includes: receiving and processing data; obtaining a transmission path of the data; transmitting the data to a destination output port of the data according to the transmission path; and processing the data at the destination output port.

The above description merely includes exemplary embodiments of the present disclosure, and is not intended to limit the protection scope of the present disclosure.

Those skilled in the art should appreciate that the term 'device' covers any suitable type of wireless user equipment, such as a mobile phone, a portable data processing device, a portable web browser or an in-vehicle mobile station.

In general, various embodiments of the present disclosure may be implemented in hardware or dedicated circuit, software, logic, or any combination thereof. For example, some aspects may be implemented in hardware, while other aspects may be implemented in firmware or software that may be executed by a controller, microprocessor, or other computing device, although the present disclosure is not limited thereto.

Embodiments of the present disclosure may be implemented by a data processor of a mobile device executing computer program instructions, such as in a processor entity, either by hardware, or by a combination of software and hardware. Computer program instructions may be assembly instructions, instruction set architecture (ISA) instructions, machine instructions, machine-related instructions, microcode, firmware instructions, status setting data, or source or target code written in any combination of one or more programming languages.

A block diagram of any logic flow in the accompanying drawings of the present disclosure may represent program steps, or may represent interconnected logic circuits, modules, and functions, or may represent a combination of program steps with logic circuits, modules, and functions. A computer program may be stored in memory. The memory may have any type suitable for a local technical environment and may be implemented using any suitable data storage technology, such as, but not limited to, read only memory (ROM), random access memory (RAM), optical memory devices and systems (digital versatile discs (DVD) or compact discs (CD). The computer readable medium may include a non-transitory storage medium. The data processor may be any type suitable for a local technical environment, such as, but not limited to, a general-purpose computer, a special purpose computer, a microprocessor, a digital signal processor (DSP), an application specific integrated circuit (ASIC), a field-programmable gate array (FGPA), and a processor based on a multi-core processor architecture.

By way of exemplary and non-limiting examples, detailed descriptions of exemplary embodiments of the present disclosure have been provided above. However, in connection with the accompanying drawings and the appended claims, various modifications and adjustments to the above embodiments are apparent to those skilled in the art without departing from the protection scope of the present disclosure. Accordingly, the proper scope of the present disclosure is determined in accordance with the appended claims.

What is claimed is:

1. A method for processing data, comprising:
receiving and processing data;
obtaining a transmission path of the data;
transmitting the data to a destination output port of the data according to the transmission path; and
processing the data at the destination output port; wherein obtaining the transmission path of the data comprises:
  determining at least one switching network node on the transmission path of the data and a configuration parameter of each of the at least one switching network node according to a source input port and the destination output port of the data; and
  configuring each of the at least one switching network node according to the configuration parameter to generate the transmission path of the data.

2. The method according to claim 1, wherein receiving and processing the data comprises:
acquiring the destination output port of the data; and
sorting the data according to the destination output port.

3. The method according to claim 1, wherein the configuration parameter is a working state of each of the at least one switching network node, and the working state includes a through transmission state and a cross transmission state.

4. The method according to claim 3, wherein transmitting the data to the destination output port of the data according to the transmission path comprises:
transmitting the data to the destination output port of the data according to the working state of each of the at least one switching network node on the transmission path.

5. The method according to claim 1, wherein processing the data at the destination output port comprises:
processing the data at the destination output port according to a validity indication signal of the data.

6. The method according to claim 5, wherein processing the data at the destination output port according to the validity indication signal of the data comprises:
receiving the data at the destination output port in response to determining that the data is valid according to the validity indication signal of the data.

7. The method according to claim 5, wherein processing the data at the destination output port according to the validity indication signal of the data comprises:

discarding the data at the destination output port in response to determining that the data is invalid according to the validity indication signal of the data.

8. A device comprising a memory, at least one processor, and a computer program stored on the memory and executable on the at least one processor, wherein the at least one processor executes the computer program to perform a method for processing data; wherein the method comprises:

receiving and processing data;

obtaining a transmission path of the data, wherein obtaining the transmission path of the data comprises: determining at least one switching network node on the transmission path of the data and a configuration parameter of each of the at least one switching network node according to a source input port and the destination output port of the data; and configuring each of the at least one switching network node according to the configuration parameter to generate the transmission path of the data;

transmitting the data to a destination output port of the data according to the transmission path; and processing the data at the destination output port.

9. The device according to claim 8, wherein processing the data comprises:

acquiring the destination output port of the data; and sorting the data according to the destination output port.

10. The device according to claim 8, wherein the configuration parameter is a working state of each of the at least one switching network node, and the working state includes a through transmission state and a cross transmission state.

11. The device according to claim 10, wherein transmitting the data to the destination output port of the data according to the transmission path comprises:

transmitting the data to the destination output port of the data according to the working state of each of the at least one switching network node on the transmission path.

12. The device according to claim 8, wherein processing the data at the destination output port comprises:

processing the data at the destination output port according to a validity indication signal of the data.

13. A non-transitory computer readable storage medium storing a computer program that, when executed by at least one processor, causes the at least one processor to perform a method for processing data; wherein the method comprises:

receiving and processing data;

obtaining a transmission path of the data, wherein obtaining the transmission path of the data comprises: determining at least one switching network node on the transmission path of the data and a configuration parameter of each of the at least one switching network node according to a source input port and the destination output port of the data; and configuring each of the at least one switching network node according to the configuration parameter to generate the transmission path of the data; and transmitting the data to a destination output port of the data according to the transmission path; and processing the data at the destination output port.

14. The non-transitory computer readable storage medium according to claim 13, wherein processing the data comprises:

acquiring the destination output port of the data; and sorting the data according to the destination output port.

15. The non-transitory computer readable storage medium according to claim 13, wherein the configuration parameter is a working state of each of the at least one switching network node, and the working state includes a through transmission state and a cross transmission state.

16. The non-transitory computer readable storage medium according to claim 15, wherein transmitting the data to the destination output port of the data according to the transmission path comprises:

transmitting the data to the destination output port of the data according to the working state of each of the at least one switching network node on the transmission path.

17. The non-transitory computer readable storage medium according to claim 13, wherein processing the data at the destination output port comprises:

processing the data at the destination output port according to a validity indication signal of the data.

* * * * *